United States Patent
Cottrell

(10) Patent No.: US 8,482,408 B1
(45) Date of Patent: Jul. 9, 2013

(54) EXPLOSIVES AND CONTRABAND DETECTION SYSTEM

(75) Inventor: Dana Cottrell, El Cajon, CA (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 636 days.

(21) Appl. No.: 12/329,726

(22) Filed: Dec. 8, 2008

(51) Int. Cl.
G08B 21/00 (2006.01)
G01H 13/00 (2006.01)

(52) U.S. Cl.
USPC .................................. 340/540; 73/597

(58) Field of Classification Search
USPC .................. 340/540; 702/56; 73/597
See application file for complete search history.

(56) References Cited

U.S. PATENT DOCUMENTS

| | | | |
|---|---|---|---|
| 4,901,576 A * | 2/1990 | Rademacher | 73/592 |
| 6,797,944 B2 | 9/2004 | Nguyen et al. | |
| 6,946,300 B2 | 9/2005 | Nguyen et al. | |
| 7,151,447 B1 | 12/2006 | Willms et al. | |
| 7,382,465 B1 | 6/2008 | Pepper | |
| 7,450,052 B2 | 11/2008 | Hausner et al. | |
| 7,701,336 B1 * | 4/2010 | Willms et al. | 340/540 |
| 2003/0221487 A1 * | 12/2003 | Silvagi et al. | 73/462 |
| 2004/0035208 A1 * | 2/2004 | Diaz et al. | 73/597 |
| 2004/0169845 A1 * | 9/2004 | Nguyen et al. | 356/36 |
| 2005/0066730 A1 * | 3/2005 | Raichle | 73/579 |
| 2005/0072236 A1 * | 4/2005 | Heyman et al. | 73/602 |
| 2005/0114081 A1 * | 5/2005 | Fukui | 702/182 |
| 2005/0270373 A1 | 12/2005 | Trela | |
| 2006/0169029 A1 | 8/2006 | Heyman | |
| 2006/0225509 A1 * | 10/2006 | Haupt et al. | 73/649 |
| 2008/0298672 A1 * | 12/2008 | Wallack et al. | 382/154 |
| 2010/0161254 A1 * | 6/2010 | Atlas et al. | 702/56 |

FOREIGN PATENT DOCUMENTS

WO   WO 2007/070080 A2   6/2007

\* cited by examiner

Primary Examiner — Brian Zimmerman
Assistant Examiner — Cal Eustaquio
(74) Attorney, Agent, or Firm — Arthur K. Samora; Kyle Eppele

(57) ABSTRACT

A non-invasive system for detection of explosives and contraband in a vehicle includes at least one laser vibrometer for measuring vehicle vibrations at one or more points on the vehicle while the vehicle is operating. One laser vibrometer can be sequentially directed to various points on the vehicle according to a predetermined single point or pattern. Or, a plurality of laser vibrometers could be used to simultaneously illuminate the vehicle. After measurement, the vehicle vibrations are compared to a database of reference vibrations, which that were taken of similar vehicles that were known to be contraband-free. The measured vibrations are compared to the vibrations pattern for the same type of vehicle. If the vibration patterns exhibit differences in frequency peaks that exceed predetermined parameters, the system alerts the operator. A more detailed inspection of the vehicle can then be accomplished.

3 Claims, 3 Drawing Sheets

EXPLOSIVES AND CONTRABAND DETECTION SYSTEM

FEDERALLY-SPONSORED RESEARCH AND DEVELOPMENT

This invention is assigned to the United States Government and is available for licensing for commercial purposes. Licensing and technical inquiries may be directed to the Office of Research and Technical Applications, Space and Naval Warfare Systems Center, Pacific, Code 2112, San Diego, Calif., 92152; voice 619-553-2778; email T2@spawar.navy.mil.

FIELD OF THE INVENTION

This disclosure relates to detection of explosives and contraband. More particularly, this disclosure relates to the use of non-invasive methods, which include laser vibrometers for detection of explosives and contraband located in hidden compartments of vehicles.

BACKGROUND OF THE INVENTION

The detection of contraband and explosives in vehicles is of paramount importance, not only to the military, but to society in general. As new detection methods emerge, smugglers continue to find new and more creative places to establish hiding places in vehicles; these hiding places are, by design, not easily accessed for inspection. One example of such a hiding place is to establish a void in a vehicle's fuel tank. Absent specialized equipment, it would be very difficult to search the fuel tank of each vehicle for special voids.

Additionally, it should be appreciated that, when deciding how thoroughly vehicles should be searched, operational security considerations must be balanced with the inconvenience of such a thorough search. In times of extremely high threat conditions, it may be feasible to search all vehicles thoroughly. But for other, lesser threat levels, it may not be feasible to search tanks and compartments of each and every vehicle passing through a checkpoint, because it takes too long to accomplish that search.

On the one hand, vehicles can be x-rayed. However, x-ray machines are extremely expensive, few in numbers, time consuming, and quite inconvenient. Dogs can be used to sniff out contraband, but they are of limited use and smugglers are finding ways to defeat this method of detection. Neutron beam detectors have been used, but because of safety issues, operators prefer not to use these devices.

In view of the above, what is desired is a system and method for searching voids and compartments of vehicles that is non-invasive, that can be quickly accomplished at a checkpoint having a high throughput of vehicles, and that is safe for the operator and relatively easy to use.

SUMMARY OF THE INVENTION

A system for detection of explosives and contraband in a vehicle, can include at least one laser vibrometer for measuring vehicle vibrations. The laser vibrometer measures the vibration levels of an operating vehicle at various points on the vehicle. For example, the laser vibrometer can be directed to various points of a vehicle fuel tank to measure the vibrations. One laser vibrometer can be used, with the laser vibrometer being sequentially directed to predetermined points on the vehicle. Or, a plurality of laser vibrometers could be used, with each laser vibrometer illuminating the vehicle simultaneously.

After measurement, the vehicle vibrations are compared to database of reference vibrations. The database comprises vibration "footprints" that were taken of vehicles that were known to be contraband-free. The measured vibrations are compared to the vibrations pattern for the same type (make and model) of vehicle. If the vibration pattern is "different", then the system can alert the operator, who can subsequently conduct a more detailed inspection of the vehicle. The differences could be a shift in number and/or frequency of observed vibrations peaks; or, the differences could be due to the differences in amplitudes between the measured vibration peaks and the amplitude of the peaks in the reference vibration pattern for that vehicle.

For the methods of the present invention, a database of reference vibrations can be established. The database is representative of vibration patterns of vehicles that are known to be contraband-free. The methods can also involve the step of measuring the vehicle vibrations of an operating vehicle. The vibrations can be measured by simultaneously illuminating the vehicle at predetermined points with a plurality of laser vibrometers, or alternatively by sequentially illuminating the vehicle at predetermined points with a single laser vibrometer, to measure the vehicle vibrations. After measurement, the vehicle vibrations are compared to reference vibration for that same make and model of vehicle. If the differences in vibrations exceed a predetermined amount, the vehicle is deemed to be carrying contraband and a more detailed inspection of the vehicle is warranted.

BRIEF DESCRIPTION OF THE DRAWINGS

The novel features of the present invention will be best understood from the accompanying drawings, taken in conjunction with the accompanying description, in which similarly-referenced characters refer to similarly-referenced parts, and in which.

DETAILED WRITTEN DESCRIPTION OF THE EMBODIMENTS

Figure 1:
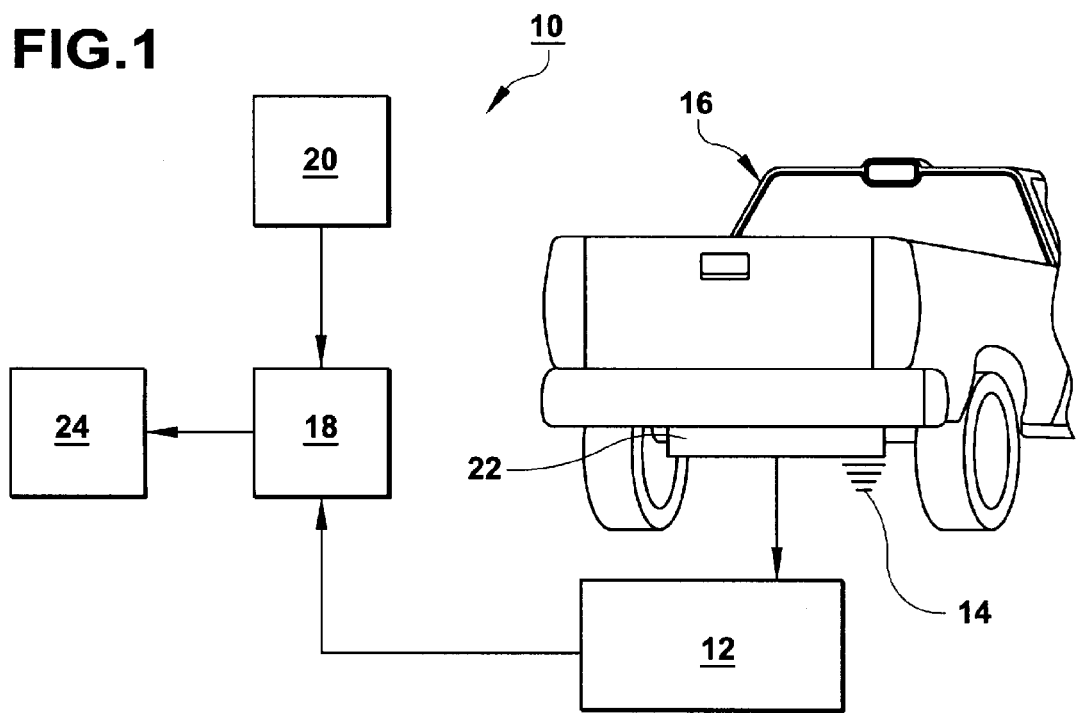
FIG. 1 is a block diagram of the explosives and contraband detection system according to several embodiments of the present invention.

Referring initially to FIG. 1, the explosives and contraband detection system in accordance with several embodiments of the invention is shown and is generally designated by reference character 10. As shown, system 10 includes an accelerometer 12 for measuring vibrations 14 of an operating vehicle 16. The accelerometer is in communication with a processor 18 and sends the measured vibrations 14 to processor 18 during operation of the system. This can be accomplished via a hardwired data link if processor 18 is proximate accelerometer 12, or the vibration measurement data can be sent via wireless connection if the processor is located remotely from accelerometer 12.

The processor 18 is also connected to a database 20. Database 20 contains a multitude of representative vibration patterns from vehicles that are known to be contraband-free or free of hidden compartments. Explosives or contraband material packed into a hidden compartment will dampen out the vibrations in the sides of the compartment. If a compartment of a vehicle such as a gas tank 22 is modified, changes in vibration frequencies and levels will occur. An accelerometer or laser vibrometer can measure the vibrations of the compartment in question.

For operation, accelerometer 12 measures the vehicle vibrations 14 and transmits the resulting vibration data to processor 18. The processor receives the measured vibrations from the accelerometer 12. The processor accesses database 20 for reference vibrations for the same type of vehicle; the processor then compares the measured vibrations to reference vibrations. If the differences exceed predetermined limits, then the processor can cause a visual/audible alarm at the display 24, which is connected to the processor 18. In response, the checkpoint operator (not shown) can direct the vehicle to a more detailed secondary inspection.

The system 10 shown in FIG. 1 can exist in several configurations. For example, in the case where a vehicle checkpoint is fixed, the accelerometer can be fixed in place at the checkpoint. Alternatively, a hand held accelerometer can be used. In either case, the accelerometer can be hardwired to a fixed processor; or, the accelerometer can have a wireless connection to a portable processor, such as a laptop of similar type of processor.

In several embodiments of the invention, a laser vibrometer 26 can be used as the accelerometer to measure vehicle vibrations when it is more convenient to measure and transmit vibration data in an extremely timely manner. For the configuration shown in FIG. 1, a single laser vibrometer can be used, and the single laser vibrometer can be sequentially directed at a predetermined point or plurality of points that may or may not define a grid. For this embodiment, the processor can also function as a control to selectively activate/deactivate the single laser vibrometer over each successive point in the grid. Exemplary measurements points on the vehicle 16 to be searched include areas on a vehicle where hidden compartments are likely to exist, such as the fuel tank, or the vehicle door panels (vibrations in other areas can also be measured).

Figure 2:
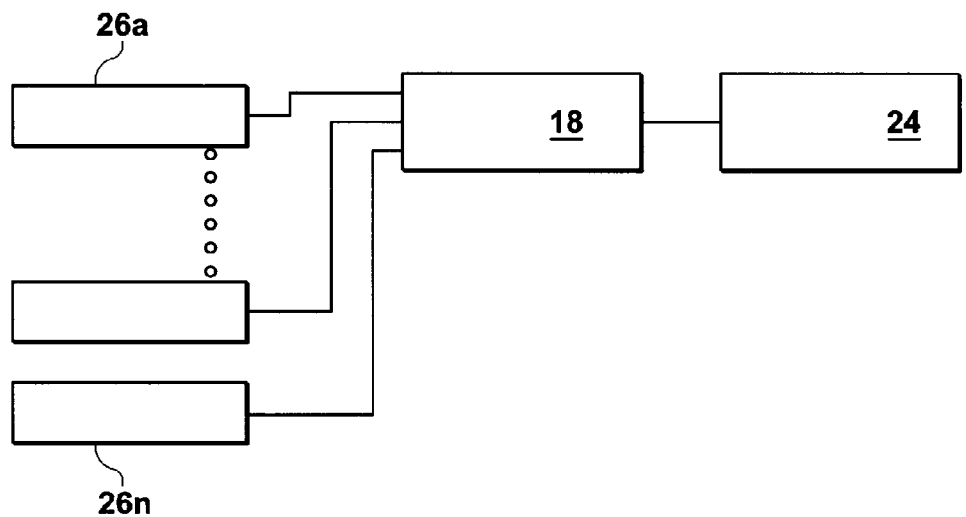
FIG. 2 is a block diagram of an alternative embodiment for the laser vibrometer for the system shown in FIG. 1.

An alternative embodiment of the invention is shown in FIG. 2. As shown, a plurality of laser vibrometers 26a-26n can be used to simultaneous illuminate vehicle 16 at predetermined points. The activation/deactivation of the laser vibrometer can be accomplished by processor 18, which in this embodiment would have an additional function as a controller for the laser vibrometers. Specialized fiber optic probes can allow for the examination of locations that are difficult to access. It should also be appreciated that any accelerometer that is capable of measuring vehicle vibrations could be used. For example, piezoelectric, magnetic induction or optical accelerometers could also be used.

The aforementioned database 20 includes a statistical average of data collected for several vehicles of the same make and model. The vehicles could be chosen according to historical data of previous use for carrying of contraband (i.e., certain types of vehicles are used for carrying of contraband much more often than others). Collected data can be compared to a database of measurements typical for these preselected vehicles. A scanning vibrometer can measure entire surfaces. This method is quite comprehensive and generates a lot of vibration data. Such measured data can be more difficult to interpret and compare to a data base, so the amount of measured vibrations should be commensurate with the processing capabilities of the system processor 18.

Figure 3:
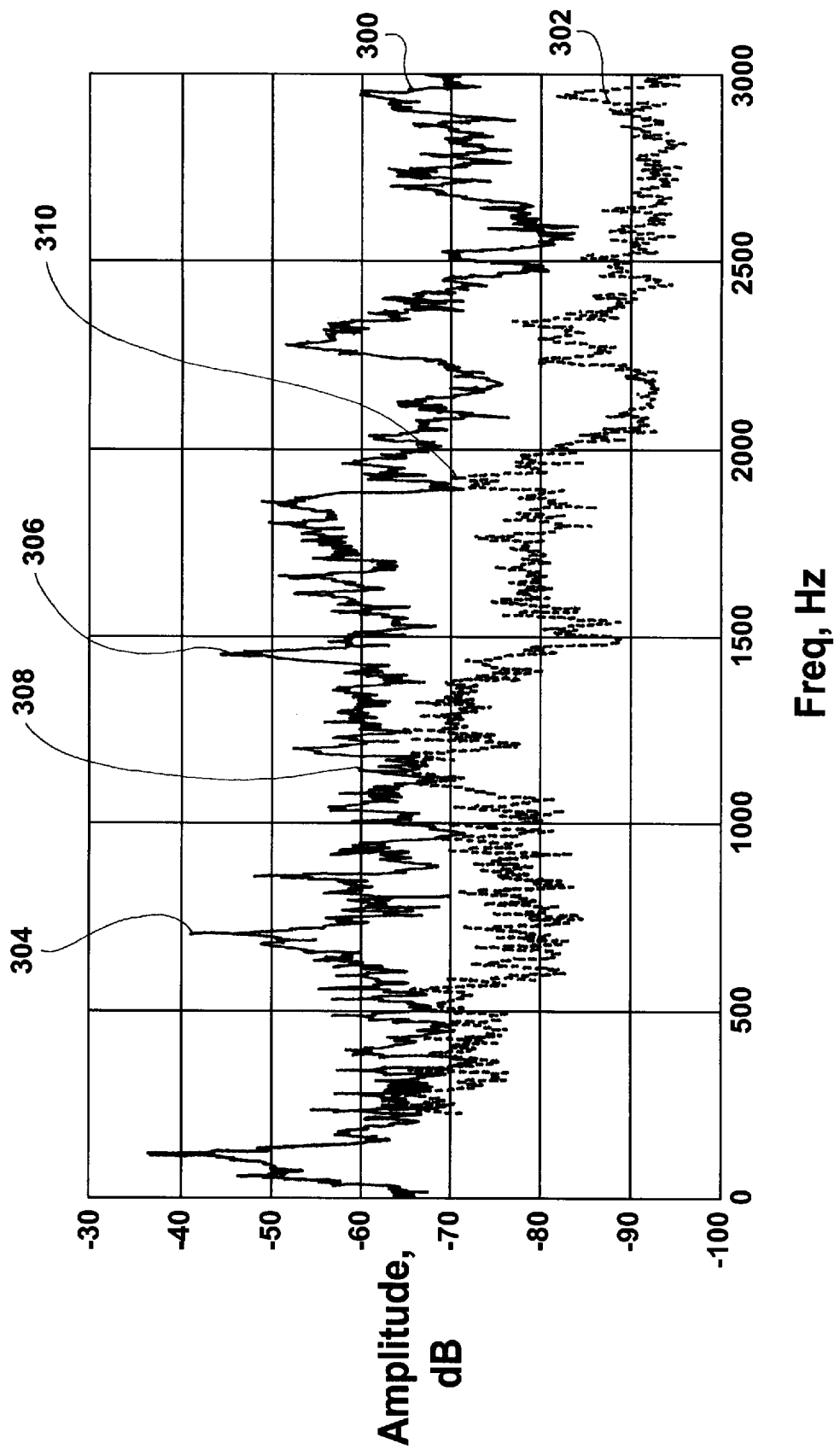
FIG. 3 is a graph of vibration responses, which depicts the shift in vibration characteristics for a unmodified fuel tank of a vehicle when compared to a fuel tank that has had a secret compartment welded therein; and, FIG. 4 is a block diagram that is representative of methods according to several embodiments of the present invention.

FIG. 3 is illustrative of the differences in vibration patterns between modified and unmodified vehicles, and how those differences in vibration patterns can be exploited to determine whether a vehicle is carrying contraband. Referring now to FIG. 3, the unmodified vehicle pattern 300 for a gas tank of Volkswagen Beetle that is known to be free of contraband and hidden compartments is compared to the vibration pattern 302 for a gas tank that was taken from a Volkswagen Beetle, but with a hidden compartment that has been welded therein. As shown in FIG. 3, unmodified pattern 300 has strong peak 304 at 540 Hz and another strong peak 306 at 1450 Hz; these peaks are not in modified pattern 302. Modified vibration pattern 302 has a strong peak 308 at 1200 Hz and another peak 310 at 1900 Hz; these peaks are not present at these frequencies for the unmodified vibration pattern 300 for the unmodified gas tank.

Given the data cited in FIG. 3, a processor 18, receiving the measured vibrations as an input and accessing the reference vibrations, can distinguish between a modified tank and an unmodified tank. In sum, a gas tank with a false compartment can be distinguished from one which has not been tampered with by analyses of: (1) Specific spectral peaks, (2) General spectral trends such as suppression of low frequency bands, and (3) Phase shifts of spectral peaks. One of these characteristics could be analyzed to determine the presence/absence of a hidden compartment, or all three of these characteristics could be used to deem a vehicle as containing a hidden compartment.

Figure 4:
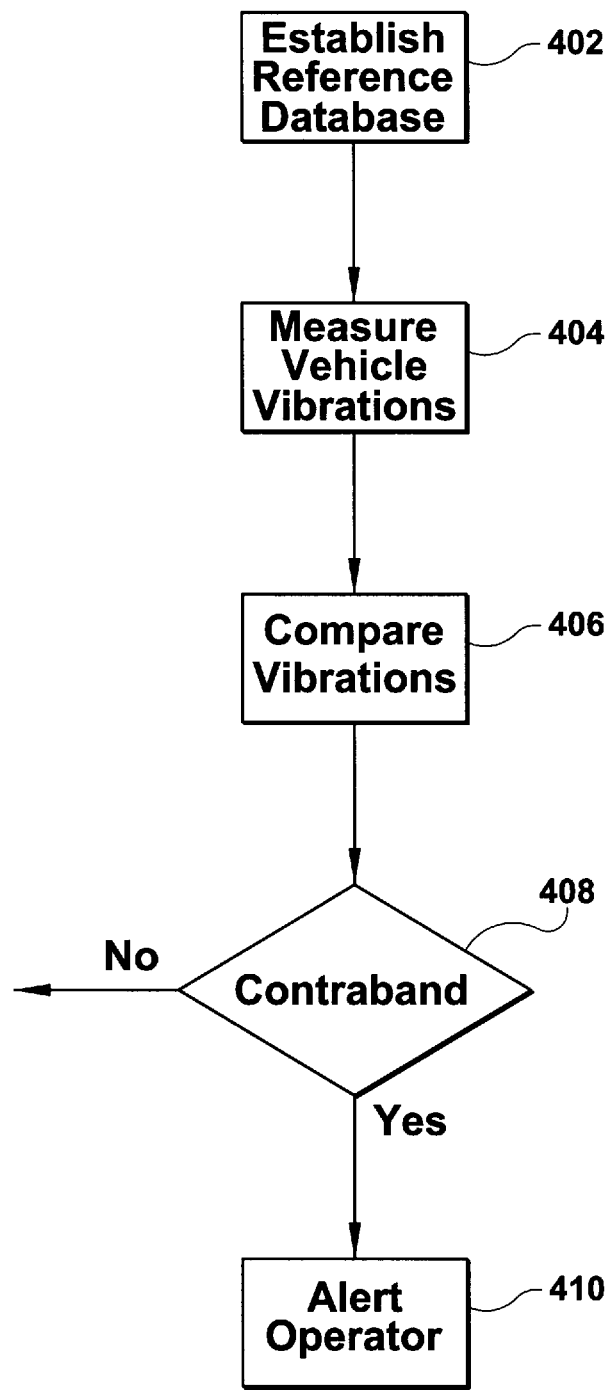

Referring now to FIG. 4, a block diagram illustrating the methods of several embodiments of the invention is shown. As shown, the method includes the initial step to establish a data base of reference vibration, as indicated for block 402. The database contains reference vibrations for vehicles of interest that are known to be free of contraband and free of hidden compartments.

The methods according to several embodiments of the present invention further include the step of measuring the vehicle vibrations for the vehicle of interest, as indicated by block 404. The vibration measurements can be carried by a single laser vibrometer that is sequentially directed at a predetermined point(s) on the vehicle that may or may not define a grid, or the vibration measure can be accomplished by a grid of laser vibrations that are simultaneously activated to illuminate the vehicle and obtain vibration measurements.

After measurement, the vehicle vibrations are compared to the reference vibrations stored in the aforementioned database, as indicated by step 406. The comparison step compares the reference vibrations to the vehicle vibrations and looks for differences in specific spectral peaks, suppression of low frequency bands and/or phase shifts in the spectral peaks as detailed above. It should be appreciated that the difference parameters can be adjusted according to prior intelligence on the threat of contraband whether generalized or for a specific vehicle/type of vehicle, the vehicle throughput of the checkpoint (and the attendant need to minimize checkpoints) and the capabilities of the processor.

If the differences exceed predetermined limits, the system deems the vehicles as carrying contraband, as indicated by step 408, and alerts the operator if needed, as indicated by block 410. The predetermined can be adjusted to the needs of the user and the operational environment. On the one hand, if the security checkpoint vehicle traffic is relatively light and the threat level is deemed to be very high. The predetermined difference in parameters can be reduced, but at the expense of an increase false alarm rate. On the other hand, if vehicle traffic at the checkpoint is heavy, it may be desired to relax the predetermined parameters to minimize the false alarm rate. In this manner, vehicles such as gas trucks that can carry large amounts of explosives can be quickly inspected on sight; any future changes in measurements on the vehicle that fall out of the norm or appear suspicious would serve to alert the checkpoint operator.

The use of the terms "a" and "an" and "the" and similar references in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

What is claimed is:

1. A system for inspecting operating vehicles at a security checkpoint, said checkpoint having a desired throughput and a threat level, said vehicles having at least one compartment, said system comprising:
   at least one means for measuring vehicle vibrations generated by said compartment, said vehicle vibrations being caused the operation of said vehicle, said vehicle vibrations being measured from outside of said vehicle, said vehicle vibrations having a plurality of vehicle frequency spectral peaks and a vehicle low frequency band;
   a database of predetermined reference vibrations, said reference vibrations corresponding to said vehicles having said compartments that have not been modified, said reference vibrations being caused by the operation of said vehicles, said reference vibrations having a plurality of reference frequency spectral peaks and a reference low frequency band;
   a processor for comparing said vehicle vibrations to said reference vibrations for detecting an anomaly in said non-machinery components, said anomaly being deemed to exist when said vehicle frequency spectral peaks and said reference frequency spectral peaks differ more than a predetermined amount, and when said vehicle low frequency band amplitude is less than said reference low frequency band by a predetermined amount; and,
   said processor adjusting said spectral peak predetermined amount and said frequency band predetermined amount according to said throughput and said threat level.

2. A method for non-invasive inspection of operating vehicles at a security checkpoint, said checkpoint having a desired throughput and a threat level, said vehicles having at least one compartment, said method comprising the steps of:
   A) establishing a database of reference vibrations corresponding to said vehicles, said reference vibrations having emanated from the exterior surface of said compartment, said reference vibrations being caused by the operation of said vehicles, said reference vibrations further having a plurality of reference frequency spectral peaks and a reference low frequency band; corresponding to said compartment that has not been modified;
   B) measuring vehicle vibrations corresponding to said vehicles, and further emanating from the exterior surface of said compartment, said vehicle vibrations being caused by the operation of said vehicle, said vehicle vibrations further having a plurality of vehicle frequency spectral peaks and a vehicle low frequency band;
   C) comparing said vehicle vibrations to said reference vibrations;
   D) deeming said vehicle as having an anomaly in at least one compartment when the results of said step C) indicate that said vehicle low frequency band is less than said reference low frequency band by a predetermined amount, and that said vehicle frequency spectral peaks differ from said reference frequency spectral peaks by a predetermined amount; and,
   D1) adjusting said frequency band predetermined amount and said spectral peak predetermined amount according to said desired throughput and said threat level.

3. The method of claim 2, further comprising the step of:
   E) alerting the system operator.

* * * * *